(12) United States Patent
Zhu

(10) Patent No.: US 10,396,536 B2
(45) Date of Patent: Aug. 27, 2019

(54) TOOL USED FOR CONNECTING BUSBARS

(71) Applicant: Gong Zhu, Xiamen (CN)

(72) Inventor: Gong Zhu, Xiamen (CN)

( * ) Notice: Subject to any disclaimer, the term of this patent is extended or adjusted under 35 U.S.C. 154(b) by 0 days.

(21) Appl. No.: 15/919,242

(22) Filed: Mar. 13, 2018

(65) Prior Publication Data

US 2018/0294632 A1   Oct. 11, 2018

(30) Foreign Application Priority Data

Apr. 10, 2017   (CN) .......................... 2017 1 02291700

(51) Int. Cl.
| | |
|---|---|
| *H02G 5/00* | (2006.01) |
| *H01R 13/514* | (2006.01) |
| *H01R 4/40* | (2006.01) |
| *H01R 25/16* | (2006.01) |
| *H02G 5/06* | (2006.01) |
| *H01R 43/26* | (2006.01) |

(52) U.S. Cl.
CPC .............. *H02G 5/007* (2013.01); *H01R 4/40* (2013.01); *H01R 13/514* (2013.01); *H01R 25/162* (2013.01); *H01R 43/26* (2013.01); *H02G 5/002* (2013.01); *H02G 5/066* (2013.01)

(58) Field of Classification Search
CPC ........ H02G 5/007; H02G 5/002; H02G 5/066; H01R 4/40; H01R 13/514; H01R 25/162; H01R 43/26
USPC ....................................................... 174/88 B
See application file for complete search history.

(56) References Cited

FOREIGN PATENT DOCUMENTS

| CN | 203209582 | * | 9/2013 |
|---|---|---|---|
| CN | 203209582 U | * | 9/2013 |
| CN | 203221311 | * | 10/2013 |
| CN | 203221311 U | * | 10/2013 |
| CN | 107030463 | * | 8/2017 |
| CN | 107030463 A | * | 8/2017 |

* cited by examiner

*Primary Examiner* — Timothy J Thompson
*Assistant Examiner* — Charles Pizzuto

(57) ABSTRACT

The invention relates to an electric device, especially to a tool used for connecting busbars, said tool comprises an electric motor driving unit and an electric control unit; said tool further comprises a stationary portion removably connects to a busbar, a movable portion removably connects to a busbar and a loading portion for clamping connecting rods. Said movable portion is movably connected to a first and second stationary shaft of said stationary portion, said movable portion is connected to a movable shaft by a screw pair, said movable portion is fixedly connected to said electric motor driving unit, said movable shaft is driven to rotate around its axis by said electric motor driving unit, said loading portion is movably connected to said second stationary shaft and slides between a body of said stationary portion and a body of said movable portion, said loading portion rotates around said second stationary shaft. It is achieved that a plurality of connecting rods are simultaneously mounted to busbars and that two busbars are connected in a form of butt-and-butt connecting.

9 Claims, 12 Drawing Sheets

TOOL USED FOR CONNECTING BUSBARS

RELATED APPLICATION

This application claims priority to China Patent Application No. 201710229170.0 filed on Apr. 10, 2017, the entire content of which is hereby incorporated by reference.

FIELD OF THE INVENTION

The invention relates to an electric device, especially to a tool used for connecting busbars.

DESCRIPTION OF PRIOR ART

In a field of power distribution, partly overlapping two busbars is usually used to be a manner of a connection between two busbas, then using bolts and nuts to fasten them. As this manner required, there is a certain length of two busbars needed to overlap for keeping a current density of a touching surface within a normal range of values so as to make the connecting part meet requirements of related standards. In order to keep a low temperature rising of an electric device, usually a length of overlapping is increased for increasing a touching surface so as to reduce a current density thereof. However, increasing the length of overlapping may increase amounts of busbars resulted in increasing cost. Electric clearance or phase distance between busbars may be reduced as a result of bolts used for fastening, in order not to reduce the electric clearance or phase distance, a distance between busbars needs to be increased, however increasing the distance necessarily enlarge an occupation space of busbars. How to increase a touching surface for reducing a temperature rising not resulted in reducing electric clearance or phase distance or enlarging occupation space of busbars, there is a new manner of connecting busbars to solve the above problem, busbars are connected in a form of butt-and-butt connecting via connecting rods, see FIG. 21.

SUMMARY OF THE PRESENT INVENTION

The object of the invention is to provide a tool used to mount connecting rods to busbars for connecting busbars in a form of butt-and-butt connecting.

Such object is achieved by providing a tool used for connecting busbars as defined in claim 1. Further advantageous according to the invention will be apparent from the dependent claims.

The invention provides a tool used for connecting busbars, said tool comprises an electric motor driving unit and an electric control unit connected with an electrical power input; said tool further comprises a stationary portion removably connected to a first busbar, a movable portion removably connected to a second busbar and a loading portion for clamping connecting rods. Said connecting rod configured to mount to a pre-hole of a connecting surface of said first busbar and said second busbar, said first and second busbars being connected by said connecting rod. Said movable portion is movably connected to a first and second stationary shaft of said stationary portion, said movable portion is connected to a movable shaft by a screw pair, said movable portion is fixedly connected to said electric motor driving unit of said stationary portion, said movable shaft is driven to rotate around its axis by said electric motor driving unit, said loading portion is movably connected to said second stationary shaft of said stationary portion and slides between a body of said stationary portion and a body of said movable portion, said loading portion rotates around said second stationary shaft.

Said stationary portion comprises said first stationary shaft, said second stationary shaft parallel to said first stationary shaft, said movable shaft parallel to said first stationary shaft, a first stationary plate perpendicular to and fixedly connected to said first and second stationary shaft, a second stationary plate perpendicular to and fixedly connected to said first and second stationary shaft, said electric motor driving unit arranged between said first and second stationary plate, a third stationary plate perpendicular to and fixedly connected to said first and second stationary shaft, a fourth stationary plate perpendicular to and fixedly connected to said first and second stationary plate, a first positioning pillar arranged to said fourth stationary plate for inserting into a positioning hole of said first busbar. Said movable shaft is fixedly connected to a rotating shaft of said electric motor driving unit by a coupler. Said movable portion comprises a seventh stationary plate, a fifth stationary plate perpendicular to and fixedly connected to said seventh stationary plate, a sixth stationary plate perpendicular to and fixedly connected to said seventh stationary plate, a second positioning pillar arranged to said seventh stationary plate for inserting into a positioning hole of said second busbar, a screw nut arranged to said fifth stationary plate for coupling with a screw portion of said movable shaft, a clamping portion for clamping said second busbar arranged between said fifth and sixth stationary plate and through said seven stationary plate, a limiting portion arranged to said seven stationary plate for limiting said clamping portion to move. Said loading portion comprises two movable plates which respectively open or close with respect to an axis of said second stationary shaft, said movable plate comprises a receiving cavity for receiving connecting rods. Said first and second stationary shaft of said stationary portion penetrate through said movable portion, an end of said movable shaft of said stationary portion rotatably connects to said third stationary plate, said movable portion slides between said third and first stationary plate of said stationary portion, said second stationary shaft of said stationary portion penetrates through said loading portion, which slides between said fifth stationary plate of said movable portion and said first stationary plate of said stationary portion and rotates around said second stationary shaft, said fifth stationary plate is parallel to said sixth stationary plate.

Said stationary portion further comprises a first heating portion arranged to said fourth stationary plate for heating said first busbar, said first heating portion movably connects to said fourth stationary plate to adjust a distance between said first heating portion and said first busbar. Said movable portion further comprises a second heating portion arranged to said seventh stationary plate for heating said second busbar, said second heating portion movably connects to said seventh stationary plate to adjust a distance between said second heating portion and said second busbar.

Said stationary portion further comprises a supporting portion for supporting a loading portion, a supporting end of said supporting portion penetrates through a first stationary plate, a length of said supporting end protruding from said first stationary plate (14) is adjusted by a sliding block of said supporting portion.

Said limiting portion comprises a base, a straight pin which has an interference fit with said base, a limiting end for partly inserting into said base, a spring for replacing said limiting end, a side cover fixedly connected to said limiting end and a ball head for operating. Said side cover is fastened to said base by snap-fits, said limiting end comprises a tooth for meshing with a teeth groove of said clamping portion, said tooth comprises a recess for matching with said straight pin, operating said ball head is to release meshing between said tooth and said teeth groove of said clamping portion, said spring acts on said tooth to make said tooth mesh with said teeth groove.

Said first stationary shaft is fixedly connected to said first stationary plate by a first straight pin, said second stationary shaft is fixedly connected to said first stationary plate by a second straight pin, said movable shaft is rotatably connected to said first stationary plate by a sleeve, said first stationary shaft is fixedly connected to said second stationary plate by a third straight pin, said second stationary shaft is fixedly connected to said second stationary plate by a fourth straight pin.

Said first stationary shaft is fixedly connected to said third stationary plate by a first spring pin, said second stationary shaft is fixedly connected to said third stationary plate by a second spring pin, said movable shaft is rotatably connected to said third stationary plate by a sleeve.

The invention also provides a tool used for connecting busbars, said tool comprises a pneumatic motor driving unit and an electric control unit connected with an electrical power input; said tool further comprises a stationary portion removably connected to a first busbar, a movable portion removably connected to a second busbar and a loading portion for clamping connecting rods. Said connecting rod configured to mount to a pre-hole of a connecting surface of said first busbar and said second busbar, said first and second busbars being connected by said connecting rod. Said movable portion is movably connected to a first and second stationary shaft of said stationary portion, said movable portion is connected to a movable shaft by a screw pair, said movable portion is fixedly connected to said pneumatic motor driving unit of said stationary portion, said movable shaft is driven to rotate around its axis by said pneumatic motor driving unit, said loading portion is movably connected to said second stationary shaft of said stationary portion and slides between a body of said stationary portion and a body of said movable portion, said loading portion rotates around said second stationary shaft.

The invention also provides a tool used for connecting busbars, said tool comprises an hydraulic motor driving unit and an electric control unit connected with an electrical power input; said tool further comprises a stationary portion removably connected to said first busbar, a movable portion removably connected to said second busbar and a loading portion for clamping connecting rods. Said connecting rod configured to mount to a pre-hole of a connecting surface of said first busbar and said second busbar, said first and second busbars being connected by said connecting rod. Said movable portion is movably connected to a first and second stationary shaft of said stationary portion, said movable portion is connected to a movable shaft by a screw pair, said movable portion is fixedly connected to said hydraulic motor driving unit of said stationary portion, said movable shaft is driven to rotate around its axis by said hydraulic motor driving unit, said loading portion is movably connected to said second stationary shaft of said stationary portion and slides between a body of said stationary portion and a body of said movable portion, said loading portion rotates around said second stationary shaft.

Advantageous Effects

1. It is achieved that a plurality of connecting rods are simultaneously mounted to busbars and that two busbars are connected in a form of butt-and-butt connecting.

2. A movable portion comprises a clamping portion and a second positioning pillar, while a stationary portion comprises a first positioning pillar, such arrangement benefits that a second busbar is capable to adjust its position before connecting till a second busbar, connecting rods and a first busbar are totally aligned with one another. Each product needs to adjust its position according to site condition when they are in an assemble process, because accuracy in busbar assemble site is not very high. A second busbar and a connecting tool can be seen as one whole part because of a movable portion clamping a second basbar, this whole part can rotate around an axis of a first positioning pillar, also can move along an axis of a first positioning pillar, a second busbar can slide along a stationary shaft of a stationary portion when it is clamped by a movable portion. Therefore, a second busbar is capable to adjust its position before connecting till a second busbar, connecting rods and a first busbar are totally aligned with one another, such arrangement improves tool's adaptability to working condition.

3. Each of a movable portion and a stationary portion comprises a handle, which comprises buttons having the same functions, only when two hands all hold handles and simultaneously active relative buttons, relative functions of tool can work, such arrangement avoids harm to safety when connecting busbars.

4. A supporting end is telescopic to solve a storage problem after a loading portion finishing mounting connecting rods, two movable plates are supported by a supporting end to make a loading portion get out of busbars connecting path so as to avoid busbars sticking a loading portion when connecting busbars, it is good to connect busbars.

5. Open-or-close loading portion is slideable along a second stationary shaft and also rotatable around a second stationary shaft, such arrangement is convenient for loading connecting rods.

6. Using heating portion to heat busbars in a manner of high frequency electromagnetic radiation, it is an homogeneous heating to improve heating efficiency, there is no open fire at site, hidden danger is removed to improve working conditions.

7. There is an adjustment arranged to a heating portion, so heating portion is capable to heat different thickness of busbar, such arrangement improves tool's adaptability to different kinds of busbars.

BRIEF DESCRIPTION OF THE DRAWING

Further characteristics and advantages of the invention will emerge from the description of preferred, but not exclusive embodiments of the tool according to the invention, non-limiting examples of which are provided in the attached drawings, in which.

| List of reference symbols | |
|---|---|
| 1. stationary portion; | 24. limiting portion; |
| 2. movable portion; | 25. second positioning pillar; |
| 3. loading portion; | 26. second heating portion; |
| 11. first stationary shaft; | 27. clamping portion; |
| 12. second stationary shaft; | 28. seventh stationary plate; |
| 13. movable shaft; | 29. sixth stationary plate; |
| 14. first stationary plate; | 41. side cover; |
| 15. electric motor driving unit; | 42. spring; |
| 16. second stationary plate; | 43. core rod; |
| 17. first heating portion; | 44. tooth; |
| 18. supporting portion; | 45. straight pin; |
| 19. third stationary plate; | 46. limiting end; |
| 110. fourth stationary plate; | 47. base; |
| 111. first positioning pillar; | 48. recess; |
| 112. couper; | 49. ball head; |
| 21. screw nut; | 5. air input. |
| 22. fifth stationary plate; | |

DETAILED DESCRIPTION OF THE PREFERRED EMBODIMENT

At site of connecting busbars, when it is needed to connect two busbars, one of two is already fixedly mounted, the other is movable, the movable one is taken to connect to the fixedly mounted one. The fixedly mounted busbar is defined first busbar while the movable busbar is defined second busbar in the invention. It is needed to preprocess busbars before connecting process, a pre-hole is arranged to a surface which is for connecting so as to receive a connecting rod, a depth of pre-hole is slightly greater than half of connecting rod, a positioning hole is arranged to a surface which faces a tool so as to match with a positioning pillar of tool, a diameter of positioning hole is slightly greater than a diameter of positioning pillar to have a clearance fit between them.

Embodiment 1

Figure 1:
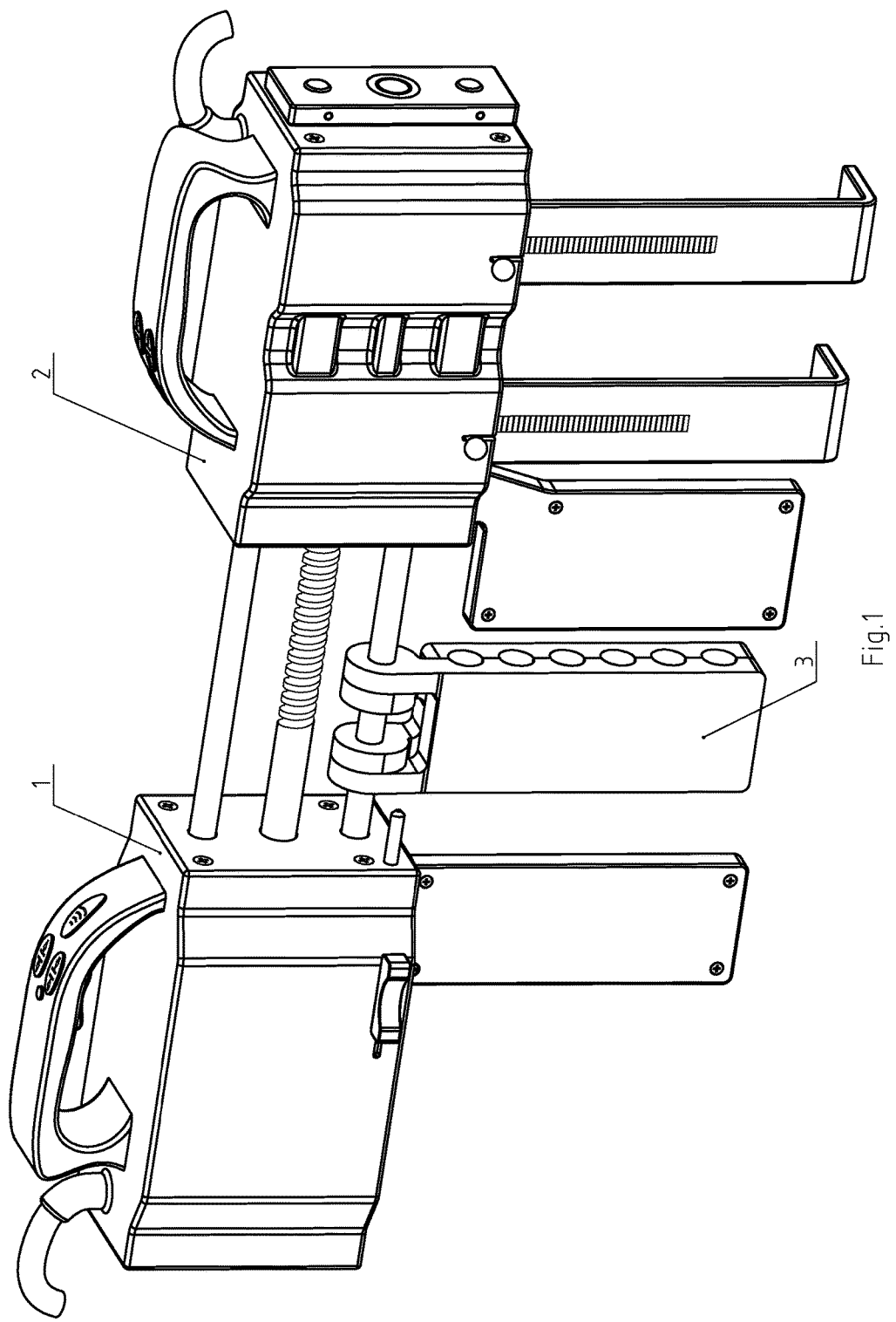
FIG. 1 is a 3d-drawing of a tool used for connecting busbars of embodiment 1, wherein a movable portion is at a first position, a loading portion is closed.
Figure 2:
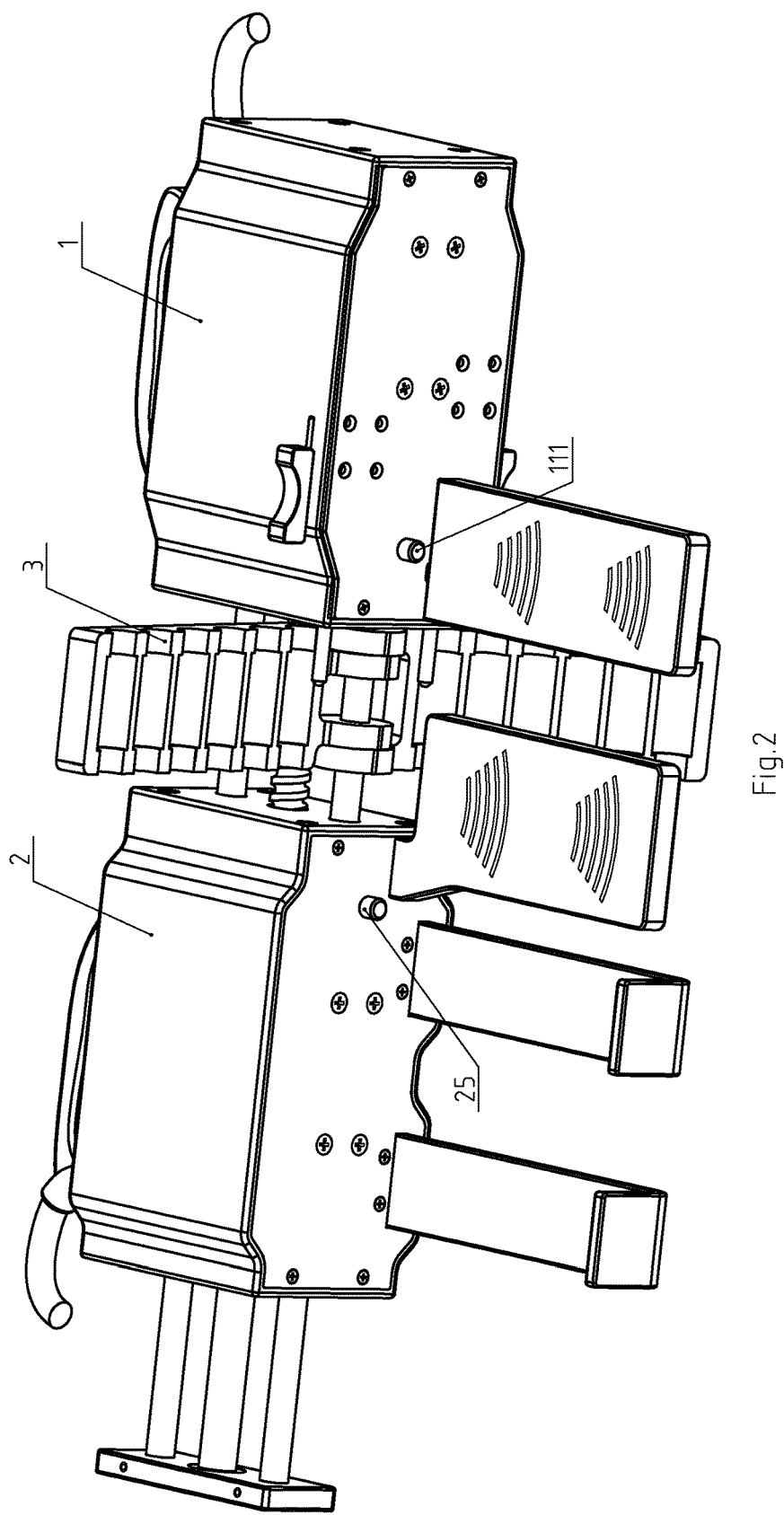
FIG. 2 is a 3d-drawing of FIG. 1 from another view, wherein a movable portion is at a second position, a loading portion is open.

Referring to FIG.1 and FIG.2, a tool used for connecting busbars comprises a stationary portion 1 removably connected to a first busbar, a movable portion 2 removably connected to a second busbar and a loading portion 3 for clamping connecting rods. Said connecting rod configured to mount to a pre-hole of a connecting surface of said first busbar and said second busbar, said first and second busbars being connected by said connecting rod. Said movable portion 2 is movably connected to a first and second stationary shaft 11,12 of said stationary portion 1, said movable portion 2 is connected to a movable shaft 13 by a screw pair. Said loading portion 3 is movably connected to said second stationary shaft 12 of said stationary portion 1 and slides between a body of said stationary portion 1 and a body of said movable portion 2. Each of said stationary and movable portion 1,2 comprises a shell with a handle, said handle comprises a plurality of buttons connected to an electric control unit, an electrical power input is connected to said electric control unit. Each of two sides of said stationary portion 1 comprises a sliding block, pushing said sliding block is to make a supporting end of a supporting portion 18 protrude from or retract into said stationary portion 1. When said supporting end is at a protruding status, said supporting end supports two movable plates of said loading portion 3 which are at an open status, to keep said supporting portion 3 at an open status is to avoid negative influence on busbars connecting. A first positioning pillar 111 is arranged to a surface of said stationary portion 1 which is to match with said first busbar, said first positioning pillar 111 matches with a positioning hole preprocessed to said first busbar so that there is no relative displacement between said stationary portion 1 and said first busbar with respect to a length direction of said first busbar when connecting busbars, that is to say that said stationary portion 1 and said first busbar are relatively static when connecting blusbars. Said first positioning pillar 111 withdraws from said positioning hole of said first busbar after busbars connecting, it is achieved that said stationary portion 1 is removably connected to a busbar. A first heating portion 17 is perpendicularly arranged to a fitting side between said first busbar and said stationary portion 1, a heating surface of said first heating portion 17 faces said first busbar. Said first heating portion 17 heats said first busbar under control of said electric control unit after activating a heating button of said handle. Said first busbar with good electrical conductivity is in a high frequency alternative magnetic field created by a coils arranged in said first heating portion 17, said first busbar heats up because of eddy effect. A second positioning pillar 25 is arranged to a surface of said movable portion 2 which is to match with said second busbar, said second positioning pillar 25 matches with a positioning hole preprocessed to said second busbar so that there is no relative displacement between said movable portion 2 and said second busbar with respect to a length direction of said second busbar when connecting busbars, that is to say that said movable portion 2 and said second busbar are relatively static when connecting blusbars. Said second heating portion 26 is perpendicularly arranged to a fitting side between a second busbar and said movable portion 2, a heating surface of said second heating portion 26 faces said second busbar. Said second heating portion 26 heats said second busbar under control of said electric control unit after activating a heating button of said handle. Said second busbar with good electrical conductivity is in a high frequency alternative magnetic field created by a coils arranged in said second heating portion 26, said second busbar heats up because of eddy effect. A clamping portion 27 is perpendicularly arranged to a fitting side between said movable portion 2 and said second busbar, manually adjusting a length of clamping portion 27 is to clamp different width of busbars, said clamping portion 27 comprises a teeth groove, a meshing between said teeth groove and a limiting portion 24 arranged in said movable portion 2 is to keep a clamping length of said clamping portion 27 so as to achieve a function of said clamping portion 27 clamping said second busbar, said second busbar does not secede from said movable portion 2 in a connecting precess, said movable portion 2 clamps said second busbar to move to a first busbar which is already fixedly mouned.

A meshing between said teeth groove and said limiting portion 24 is released by operating a ball head 49 of said limiting portion 24 so as to release a limiting effect on said clamping portion 27 from said limiting portion 24, then a clamping length is manually adjusted to achieve a function of said clamping portion 27 releasing a second busbar, it is also achieved that said movable portion 2 is removably connected to a busbar. A function of said clamping portion 27 to release said second busbar is achieved by a meshing between gears and said teeth groove, it is achieved that said movable portion 2 is removably connected to a busbar. There is an adjustment arranged to each said first and second heating portion 17,26 to be adaptable to different thickness of busbars, high frequency alternative magnetic heating is arranged to heating portion to heat busbar quickly without open fire, it is an homogeneous heating to improve heating efficiency, there is no open fire at site, hidden danger is removed to improve working conditions.

Figure 4:
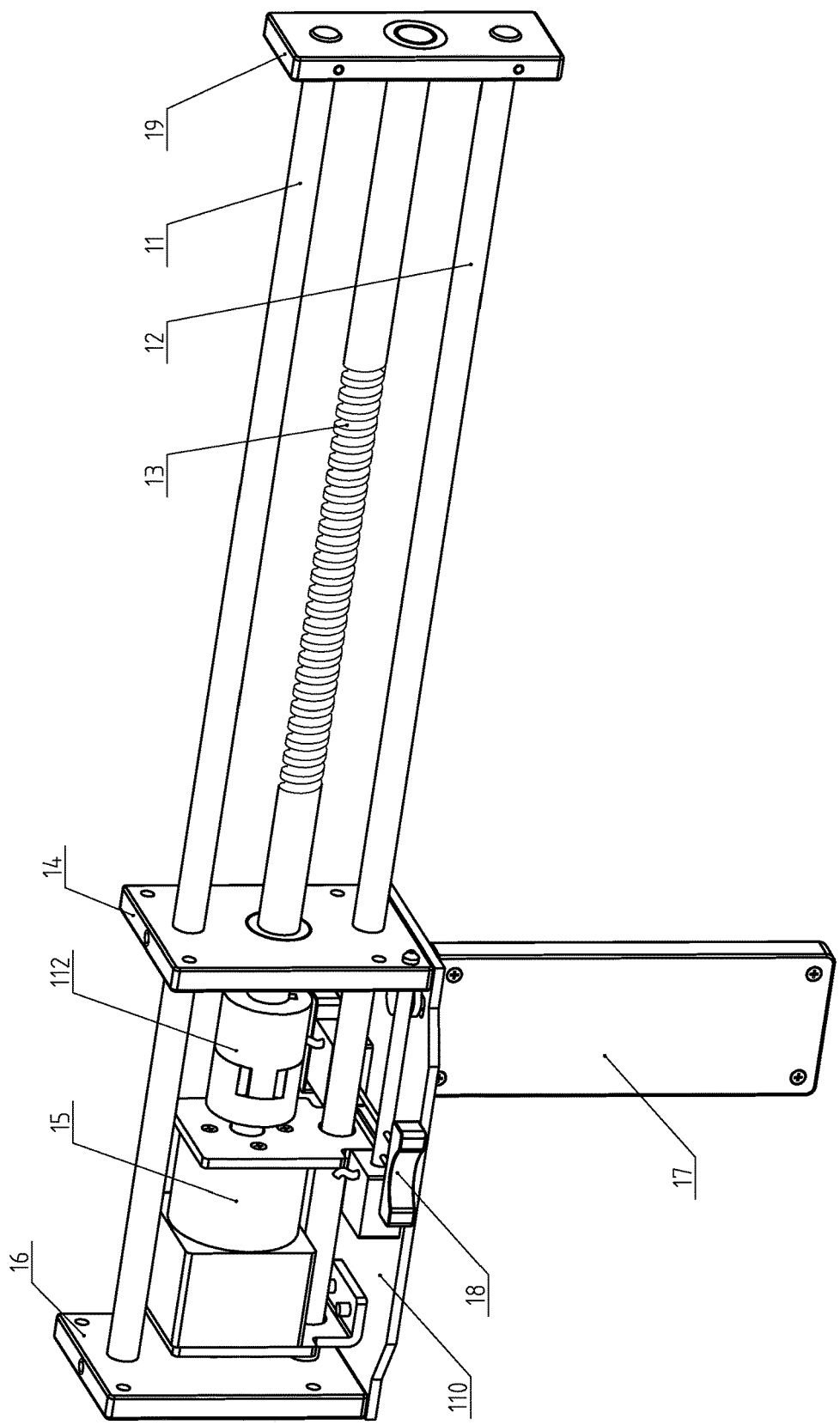
FIG. 4 is a 3d-drawing of a stationary portion of FIG. 1, wherein a shell and an electric control part are removed.

Referring to FIG.4, said stationary portion 1 comprises said first stationary shaft 11, said second stationary shaft 12 parallel to said first stationary shaft 11, said movable shaft 13 parallel to said first stationary shaft 11, a first stationary plate 14 perpendicular to and fixedly connected to said first and second stationary shaft 11,12, a second stationary plate 16 perpendicular to and fixedly connected to said first and second stationary shaft 11,12, said electric motor driving unit 15 arranged between said first and second stationary plate 14,16, a coupler 112 for connecting said electric motor driving unit 15 and said movable shaft 13, a third stationary plate 19 perpendicular to and fixedly connected to said first and second stationary shaft 11,12, a fourth stationary plate 110 perpendicular to and fixedly connected to said first and second stationary plate 14,16, a first positioning pillar 111 arranged to said fourth stationary plate 110 for inserting into a positioning hole of said first busbar, a first heating portion 17 arranged to said fourth stationary plate 110 for heating said first busbar, a supporting portion 18 for supporting a loading portion 3. An end of said movable shaft 13 is fixedly connected to a rotating shaft of said electric motor driving unit 15 by said coupler 112, said electric motor driving unit 15 drives said movable shaft 13 to rotate around its axis under control of said electric control unit, another end of said movable shaft 13 is rotatably connected to said third stationary plate 19 by a sleeve. Said first heating portion 17 is movably connected to said fourth stationary plate 110 to adjust a distance between said first heating portion 17 and said first busbar, said first heating portion 17 heats said first busbar under control of said electric control unit, heating manner is a high frequency alternative magnetic heating. A supporting end of said supporting portion 18 penetrates through a first stationary plate 14, a length of said supporting end protruding from said first stationary plate 14 is adjusted by a sliding block of said supporting portion 18. Said loading portion 3 comprises two movable plates which respectively open or close with respect to an axis of said second stationary shaft 12, said movable plate comprises a receiving cavity for receiving connecting rods and a magnetic element for keeping said loading portion 3 at a close status, a distance between each receiving cavity is identical to a distance between holes preprocessed to busbars. A connecting rod is clamped tightly by two movable plates when said loading portion 3 is at close stat, there is no relative displacement between said connecting rod and said movable plates.

Figure 3:
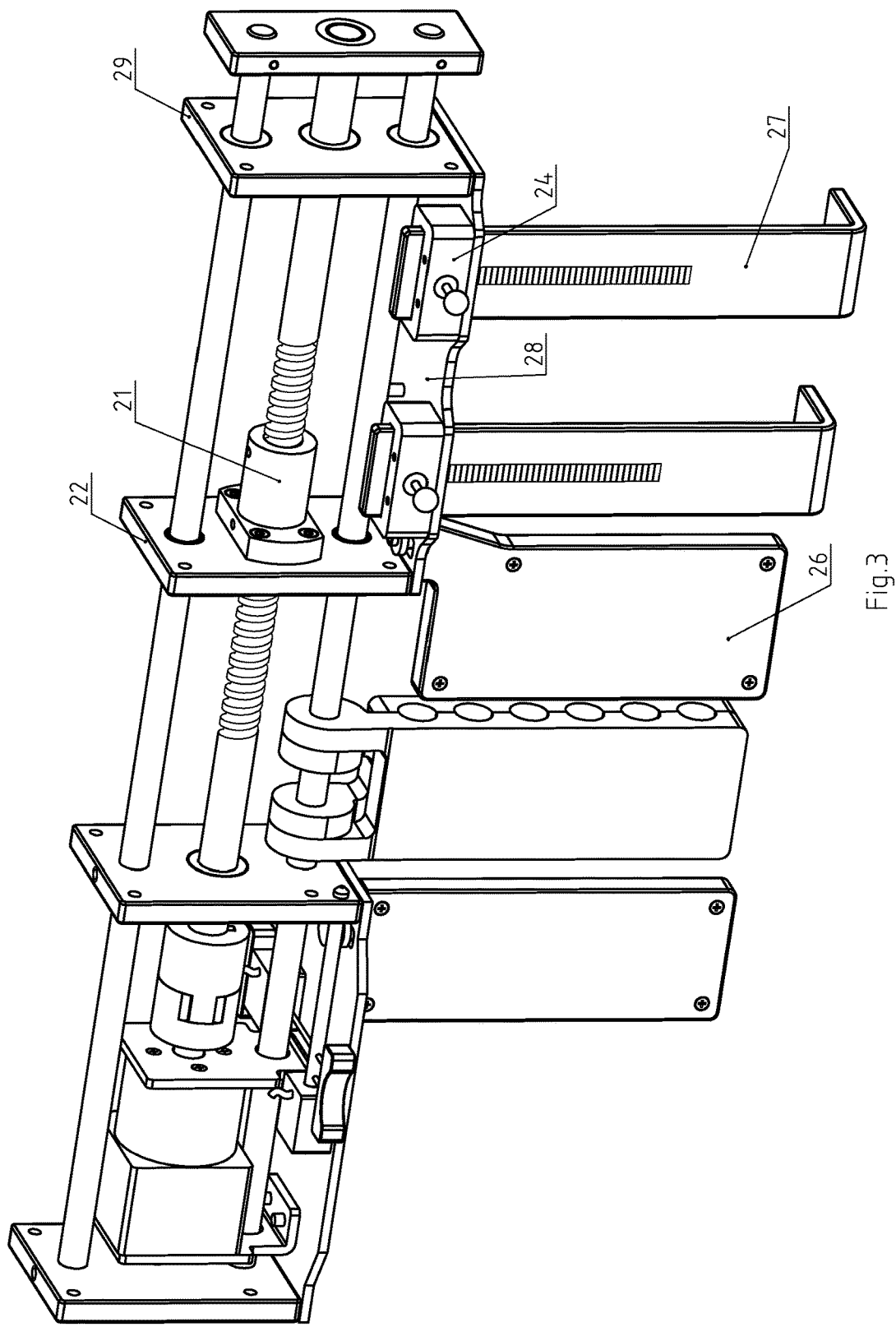
FIG. 3 is a 3d-drawing of FIG. 1, wherein a shell and an electric control part are removed.

Referring to FIG. 3, said movable portion 2 comprises a seventh stationary plate 28, a fifth stationary plate 22 perpendicular to and fixedly connected to said seventh stationary plate 28, a sixth stationary plate 29 perpendicular to and fixedly connected to said seventh stationary plate 28, a second positioning pillar 25 arranged to said seventh stationary plate 28 for inserting into a positioning hole of said second busbar, a screw nut 21 arranged to said fifth stationary plate 22 for coupling with a screw portion of said movable shaft 13, a clamping portion 27 for clamping said second busbar arranged between said fifth and sixth stationary plate 22,29 and through said seven stationary plate 28, a limiting portion 24 arranged to said seven stationary plate 28 for limiting said clamping portion 24 to move, a second heating portion 26 arranged to said seventh stationary plate 28 for heating said second busbar. A teeth arranged to said clamping portion 27 meshes with a tooth 44 arranged in said limiting portion 24. Said second heating portion 26 is connected with said electric control unit, said second heating portion 26 is movably connected to said seven stationary plate 28 to adjust a distance between said second heating portion 26 and said second busbar, said second heating portion 26 heats said second busbar under control of said electric control unit, heating manner is a high frequency alternative magnetic heating. Said fifth stationary plate 22 is parallel to said sixth stationary plate 29, said fifth stationary plate 22 comprises a sleeve, which has an interference fit with said fifth stationary plate 22 and a clearance fit with said first and second stationary shaft 11,12. Said electric control unit connected to a power input is arranged to an inner side of a shell of said movable portion2, said electric control unit electrically connects to buttons of handles and said second heating portion 26. Said second heating portion 26 works for a certain period of time after activating a heating button of a handle. When said clamping portion 26 is to clamp a busbar, firstly, operating said ball head 49 of said limiting portion 24 is to draw said ball head 49 away from a busbar so as to release a meshing relationship between said tooth 44 of said limiting portion 24 and said teeth groove of said clamping portion 27, a limiting effect on said clamping portion 27 from said limiting portion 24 is released. Secondly, continue to keep said ball head 49 at a status of drawing, meanwhile manually adjust a distance between a clamping end of clamping portion 27 and a busbar so as to make said clamping end fit with said busbar, then release said ball head 49, said tooth 44 rebuilds a meshing relationship with said teeth groove of sand clamping portion 27 as a result of a spring effect of a spring 42 arranged in said limiting portion 24, that is to say that a limiting effect on said clamping portion 27 from said limiting portion 24 works, said clamping portion 27 is unmovable to keep a status of clamping a busbar. When said clamping portion 26 is to release a busbar, firstly, operating said ball head 49 of said limiting portion 24 is to draw said ball head 49 away from a busbar so as to release a meshing relationship between said tooth 44 of said limiting portion 24 and said teeth groove of said clamping portion 27, a limiting effect on said clamping portion 27 from said limiting portion 24 is released. Secondly, continue to keep said ball head 49 at a status of drawing, meanwhile manually adjust a distance between a clamping end of clamping portion 27 and a busbar so as to make said clamping end away from said busbar, then release said ball head 49, said tooth 44 rebuilds a meshing relationship with said teeth groove of sand clamping portion 27 as a result of a spring effect of a spring 42 arranged in said limiting portion 24, that is to say that a limiting effect on said clamping portion 27 from said limiting portion 24 works, said clamping portion 27 is unmovable to keep a status of releasing a busbar.

Referring to FIG. 3, said first and second stationary shaft 11,12 of said stationary portion 1 and said movable shaft 13 penetrate through said movable portion 2, an end of said movable shaft 13 is fixedly connected to a rotating shaft of said electric motor driving unit 15 of said stationary portion 1 by a coupler, said movable shaft 13 is driven to rotate around its axis by said electric motor driving unit 15. A screw pair connecting is formed between a screw nut 21 arranged to said movable portion 2 and a screw portion arranged to said movable shaft 13, a rotation of said movable shaft 13 drives said movable portion 2 to slide axially along said first and second stationary shaft 11,13 because said screw nut 21 is fastened to said fifth stationary plate 22 of said movable portion 2, said movable portion 2 slides between said third and first stationary plate 19,14 of said stationary portion 1. Said second stationary shaft 12 of said stationary portion 1 penetrates through said loading portion 3, which slides and rotates between said fifth stationary plate 22 of said movable portion 2 and said first stationary plate 14 of said stationary portion 1. Said first stationary shaft 11 has a clearance fit with a sleeve 23 arranged to said fifth and sixth stationary plate 22,29 of said movable portion 2, second stationary shaft 12 has a clearance fit with a sleeve 23 arranged to said fifth and sixth stationary plate 22,29 of said movable portion 2, said movable shaft 13 has a clearance fit with a sleeve 23 arranged to said fifth and sixth stationary plate 22,29 of said movable portion 2. Said movable portion 2 only has one axial freedom with respect to said stationary portion 1 because of an arrangement of said first and second stationary shaft 11,12, that is to say that said movable portion 2 only slides axially to be good for busbars connecting correctly.

Figure 6:
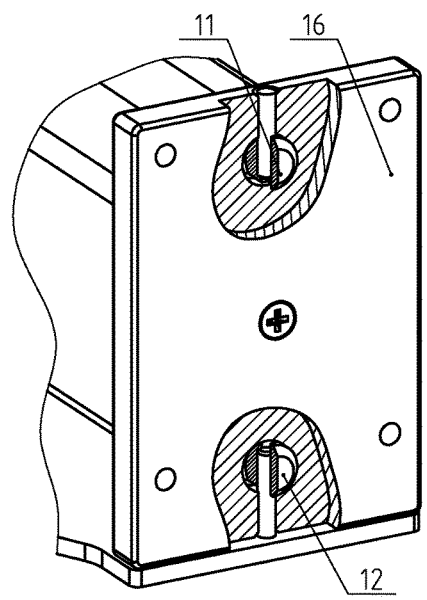
FIG. 6 is a sectional 3d-drawing of a stationary portion of FIG. 1.
Figure 8:
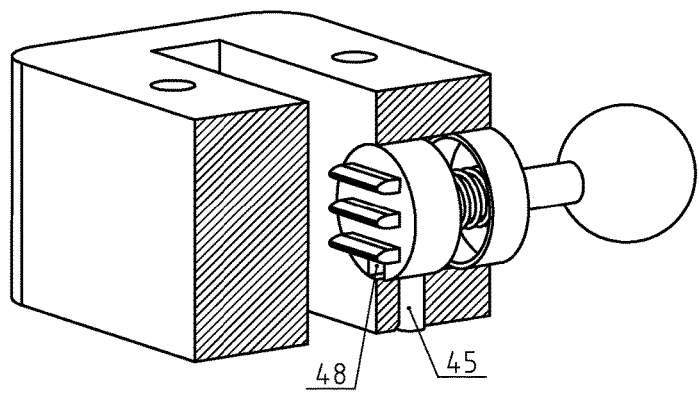
FIG. 8 is a sectional 3d-drawing of a limiting portion of the invention, wherein a tooth is at a meshing status.
Figure 9:
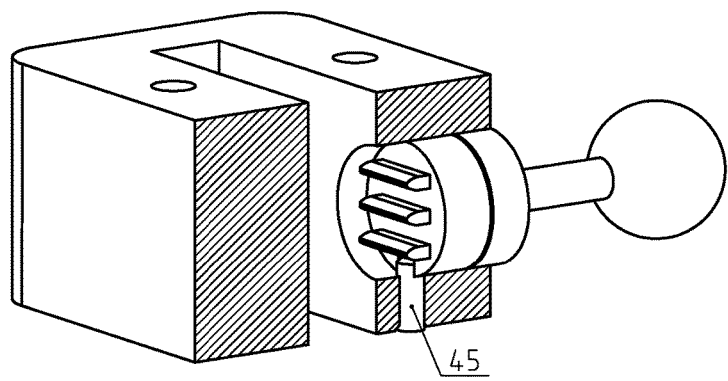
FIG. 9 is a sectional 3d-drawing of a limiting portion of the invention, wherein a tooth is not at a meshing status.
Figure 10:
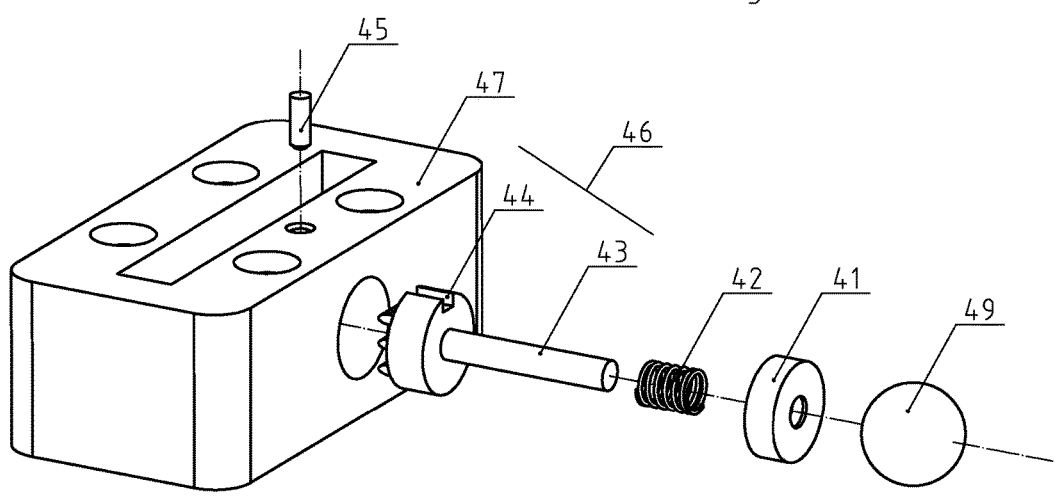
FIG. 10 is an exploded 3d-drawing of a limiting portion of the invention.

Referring to FIG.8 to FIG.10, said limiting portion 24 comprises a base 47, a straight pin 45 which has an interference fit with said base 47, a limiting end 46 for partly inserting into said base 47, a spring 42 for replacing said limiting end 46, a side cover 41 fixedly connected to said limiting end 46 and ball head for operating. Said side cover is fastened to said base 47 by snap-fits, said limiting end 46 comprises a tooth 44 meshing with a teeth groove of said clamping portion 27, said tooth 44 comprises a recess 48 matching with said straight pin 45, operating said ball head 41 is to release a meshing between said tooth 44 and said teeth groove of said clamping portion 27, spring 42 acting on said tooth 44 is to rebuild a meshing between said tooth 44 and said teeth groove, a matching between a recess arranged to said tooth 44 and a straight pin 45 is good for a correct meshing between said tooth 44 and said teeth groove. Said limiting end 46 limits a movement of said clamping portion 27 when said tooth 44 meshes with said teeth groove, said limiting end 46 does not limit a movement of said clamping portion 27 when said tooth 44 does not mesh with said teeth groove, said clamping portion 27 moves under outer force effecting. Said first stationary shaft 11 is fixedly connected to said first stationary plate 14 by a first straight pin, said second stationary shaft 12 is fixedly connected to said first stationary plate 14 by a second straight pin, said first stationary shaft 11 is fixedly connected to said second stationary plate 16 by a third straight pin, said second stationary shaft 12 is fixedly connected to said second stationary plate 16 by a fourth straight pin, see FIG.6. Said movable shaft 13 is rotatably connected to said first stationary plate 14 by a sleeve.

Figure 5:
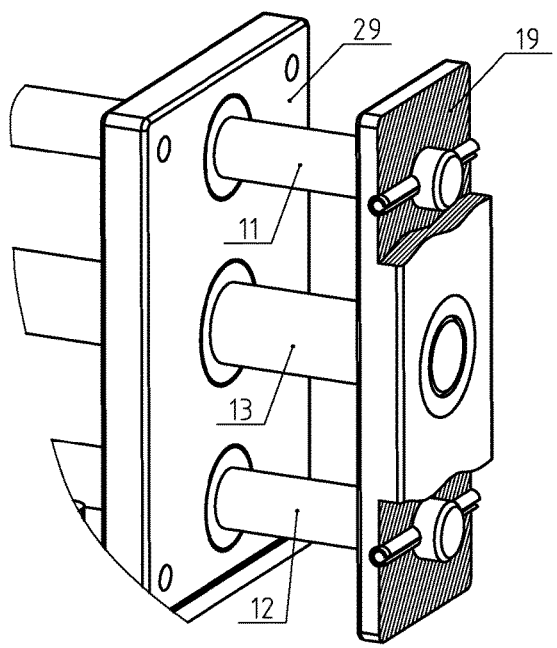
FIG. 5 is a sectional 3d-drawing of a tool used for connecting busbars of the invention.
Figure 7:
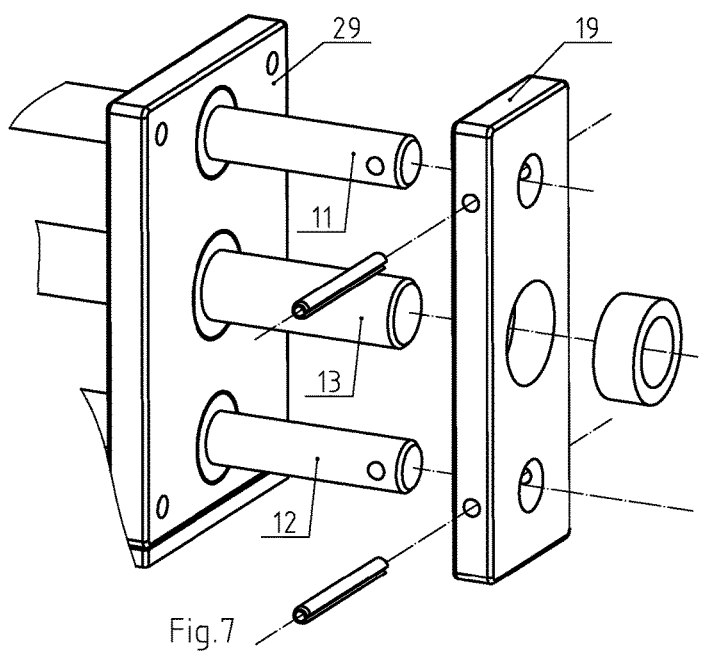
FIG. 7 is an exploded 3d-drawing of a tool of FIG. 5.

Referring to FIG. 5 and FIG.7, said first stationary shaft 11 is fixedly connected to said third stationary plate 19 by a first spring pin, said second stationary shaft 12 is fixedly connected to said third stationary plate 19 by a second spring pin. Ends of said first and second shaft 11,12 are fixedly connected by said third stationary plate 19 to increase rigidity of said stationary portion 1, such arrangement is good for said movable portion 2 to slide smooth along said first and second stationary shaft 11,12.

Process of busbars connecting is described as follows.

Figure 11:
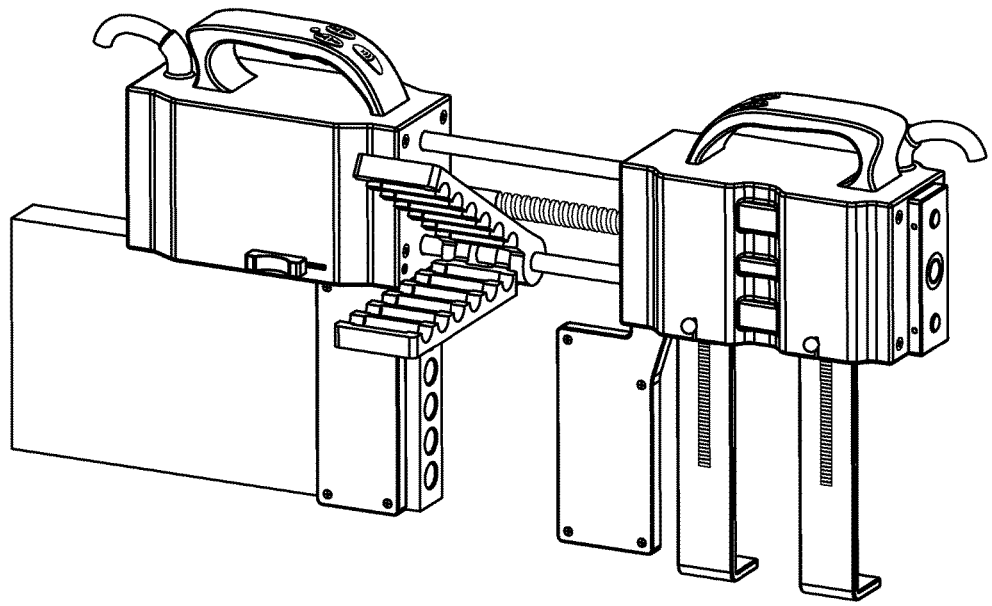
FIG. 11-20 are drawings of connecting steps using a tool of embodiment 1.

Referring to FIG. 11, inserting said first positioning pillar 111 of said stationary portion 1 into a positioning hole preprocessed to a first busbar is to make said fourth stationary plate 110 of said stationary portion 1 fit with said first busbar. Sliding movable portion 1 to a first position where said movable portion 2 fits with said third stationary plate 19 of said stationary portion 1. Operating said ball head 49 is to manually adjust said clamping portion 27 to make said clamping portion 27 move to a position to clamp a second busbar. Rotating said loading portion 3 to a position where is convenient to load connecting rods and keep said loading portion 3 at an open status.

Figure 12:
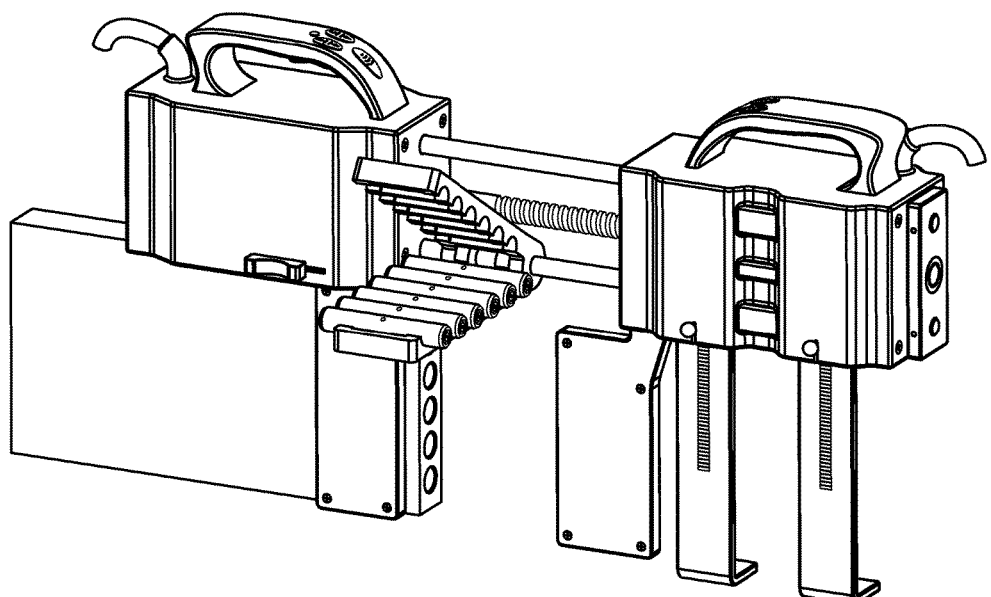

Referring to FIG. 12, centrally placing connecting rods into said receiving cavity of said loading portion 3.

Figure 13:
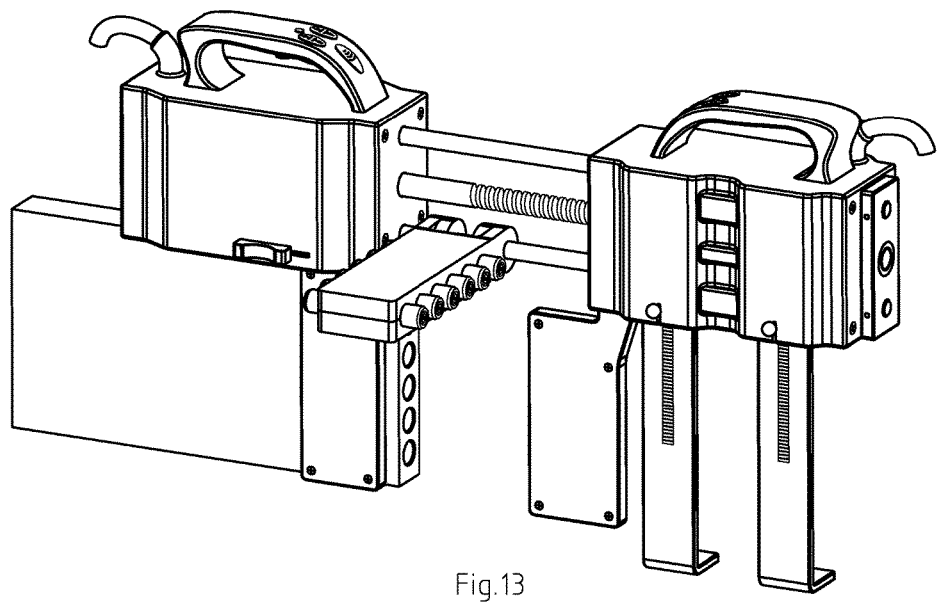

Referring to FIG. 13, closing said movable plates of said loading portion 3, said loading portion 3 keeps at a close status because of a magnetic element arranged to said movable plates.

Figure 14:
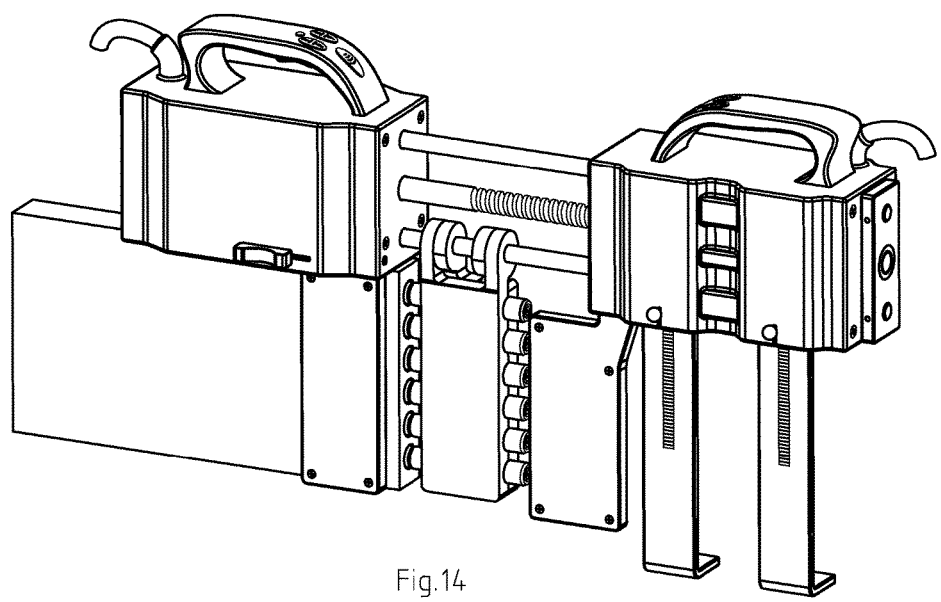

Referring to FIG. 14, rotating said loading portion 3 with connecting rods already mounted is to align connecting rods with preprocessed holes of said first busbar.

Figure 15:
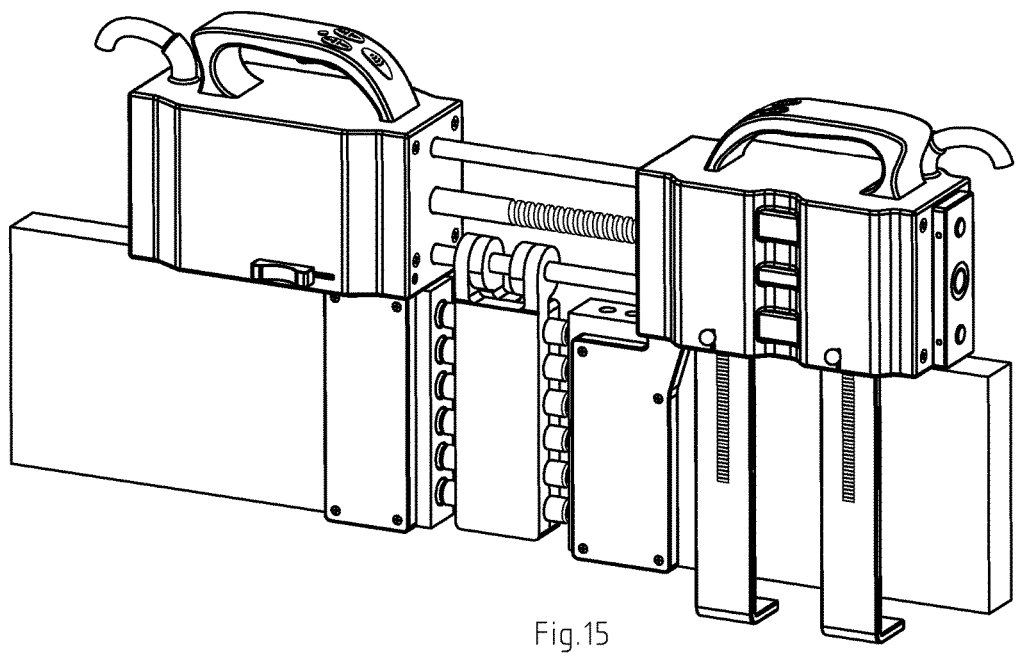

Referring to FIG. 15, inserting said second positioning pillar 25 of said movable portion 2 into a positioning hole preprocessed to said second busbar is to make said seventh stationary plate 28 of said movable portion 2 fit with said second busbar.

Figure 16:
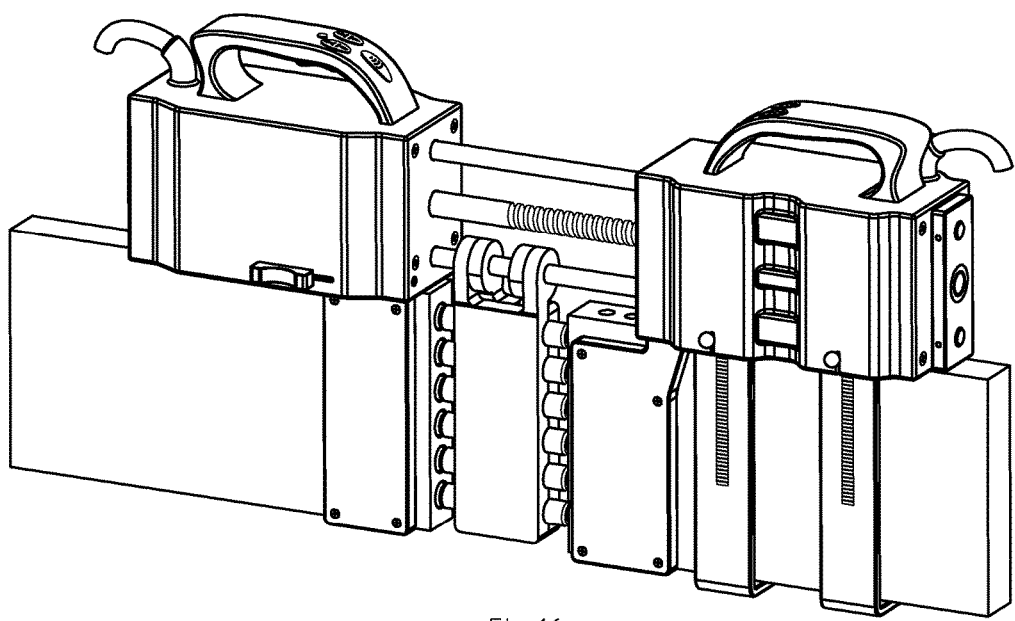

Referring to FIG. 16, operating said ball head 49 is to manually adjust said clamping portion 27 to make said clamping portion 27 clamp a second busbar. Adjusting positions of said first and second heating portion 17,26 is to make heating surfaces fit with busbars. Simultaneously activating relative buttons of two handles is to make said first and second heating portion 17,26 simultaneously heat said busbar with a certain period of time.

Figure 17:
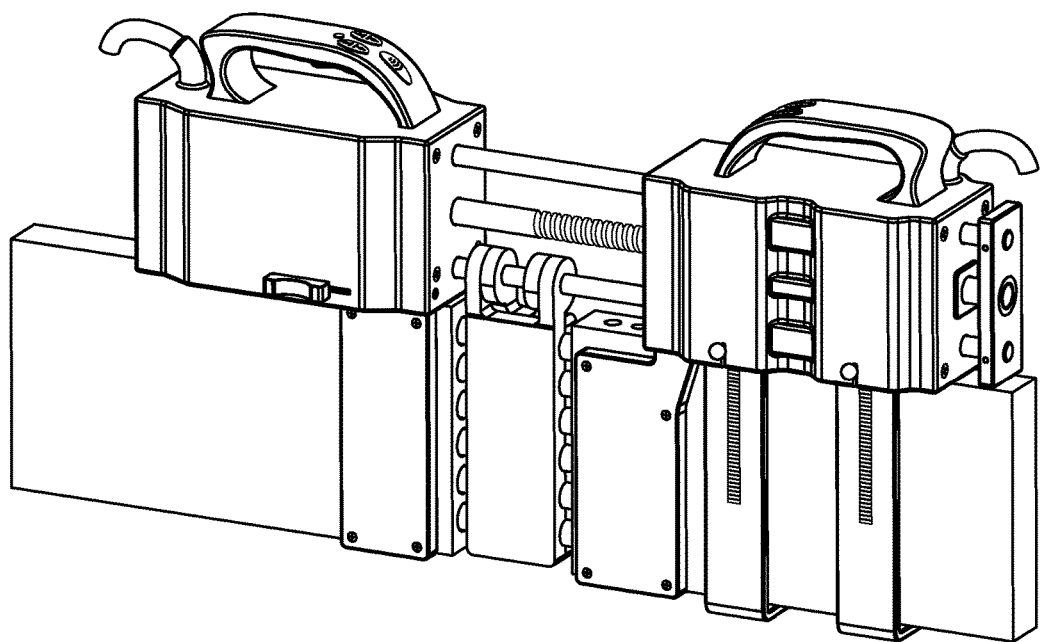

Referring to FIG. 17, after heating process, a diameter of said preprocessed hole of a busbar is greater than a diameter of said connecting rod because of a heat expansion and contraction so that said connecting rods are convenient to mount to said preprocessed holes. Simultaneously activating relative buttons of two handles is to make said electric motor driving unit 15 work, said movable portion 2 moves from a first position to a second position so as to make said connecting rods insert into said first and second busbars.

Figure 18:
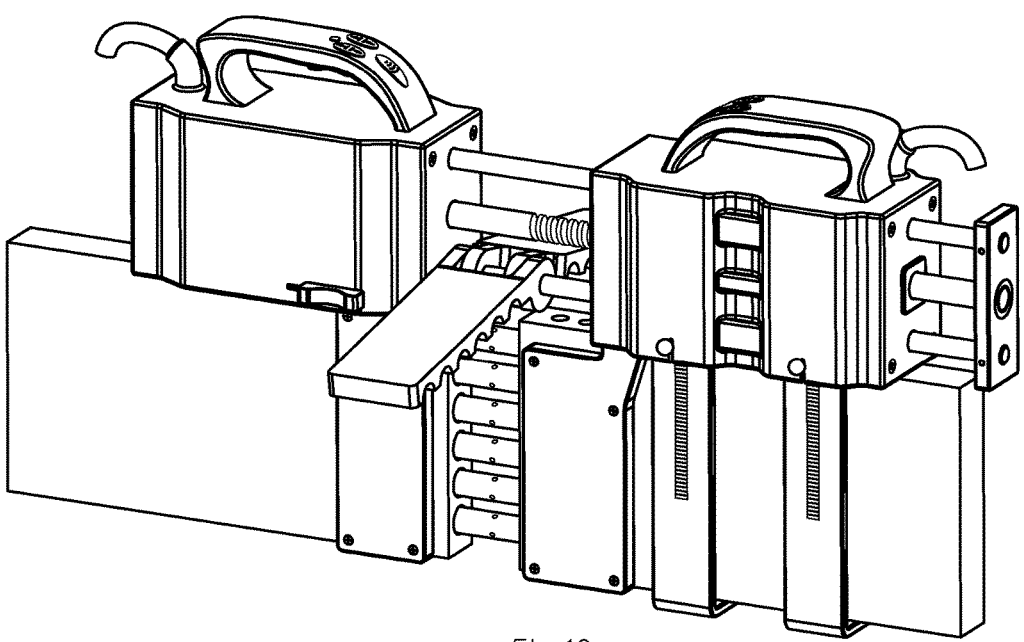

Referring to FIG. 18, after said connecting rods are partly inserting into said first and second busbars, pushing said sliding block of said supporting portion 18 of said stationary portion 1 is to make said supporting end protrude from said stationary portion 1, said loading portion 3 is kept at an open status to avoid said first and second busbars sticking said loading portion 3 when connecting busbars.

Figure 19:
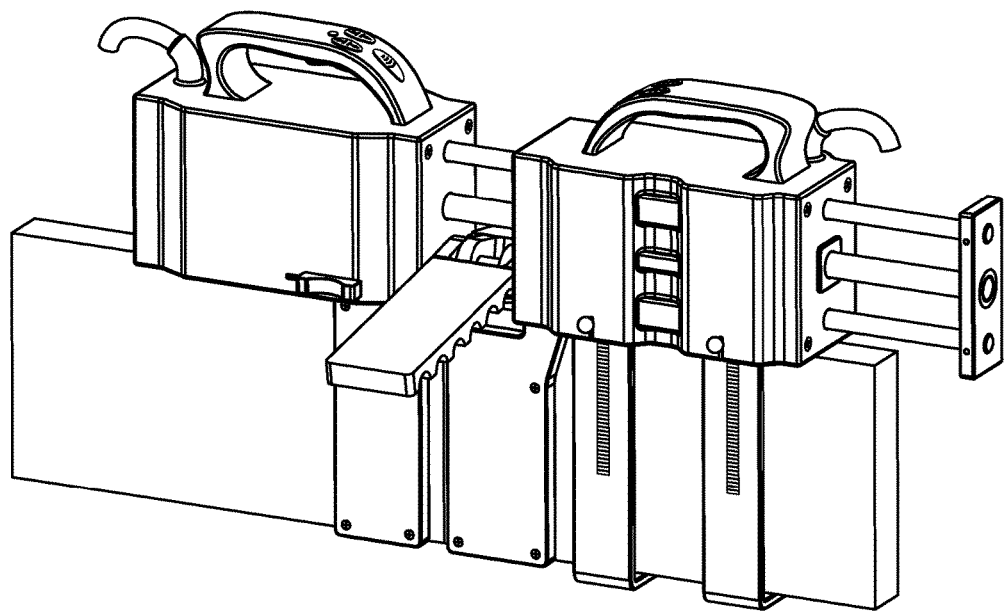

Referring to FIG. 19, continue activating relative buttons until said first and second busbars are totally fit with each other, that is to say that relative buttons are stopped activating when said movable portion 2 is at said second position.

Figure 20:
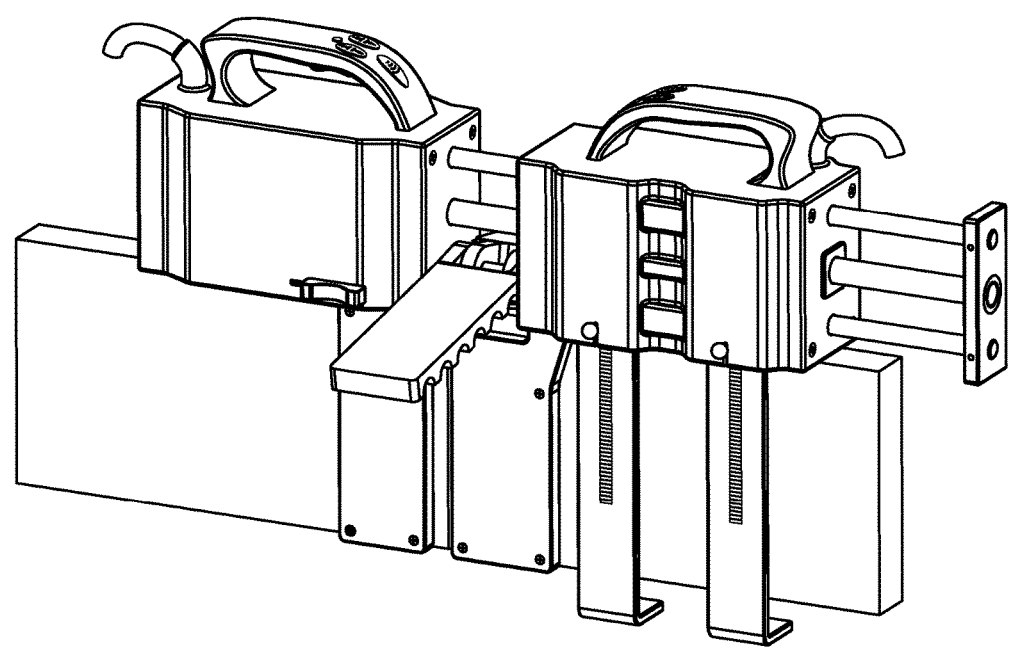
Figure 21:
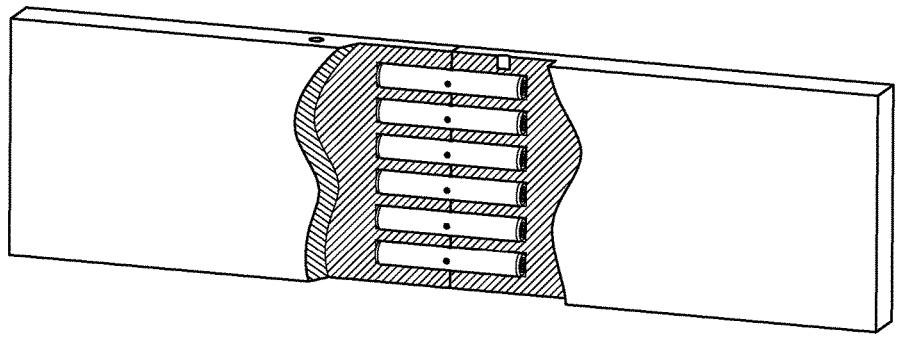
FIG. 21 is a sectional 3d-drawing of busbars after connecting.

Referring to FIG. 20, operating said ball head 49 is to manually adjust said clamping portion 27 to make said clamping portion 27 release said second busbar after busbars are cooled. Removing a tool used for connecting busbars after mounting said connecting rods and connecting busbars successfully, see FIG. 21.

Embodiment 2

Electric motor driving unit 15 in embodiment 1 is replaced by a pneumatic motor driving unit, a compressing air releasing unit is simultaneously arranged to cool busbars after heating, air used for said pneumatic cylinder driving unit and said compressing air releasing unit is supplied through an air input 5.

Figure 22:
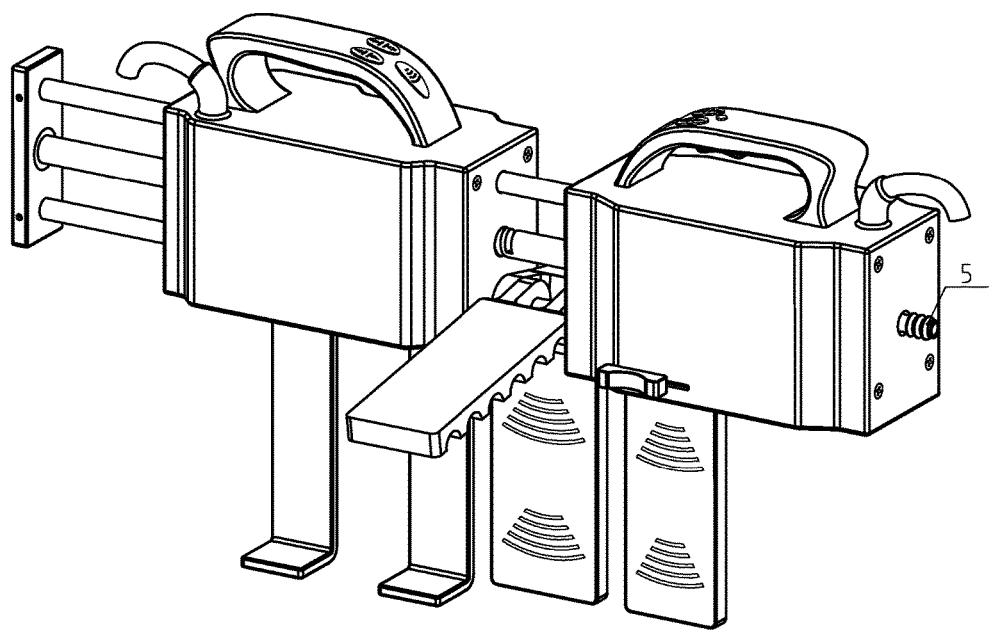
FIG. 22 is a 3d-drawing of a tool used for connecting busbars of embodiment 2.

Referring to FIG.22, a tool used for connecting busbars comprises a pneumatic motor driving unit and an electric control unit connected with an electrical power input, a stationary portion 1 removably connected to a first busbar, a movable portion 2 removably connected to a second busbar and a loading portion 3 for clamping connecting rods. Said connecting rod configured to mount to a pre-hole of a connecting surface of said first busbar and said second busbar, said first and second busbars being connected by said connecting rod. Said movable portion 2 is movably connected to a first and second stationary shaft 11,12 of said stationary portion 1, said movable portion 2 is connected to a movable shaft 13 by a screw pair, said movable portion 2 is fixedly connected to said pneumatic motor driving unit of said stationary portion 1, said movable shaft 13 is driven to rotate around its axis by said pneumatic motor driving unit, said loading portion 3 is movably connected to said second stationary shaft 12 of said stationary portion 1 and slides between a body of said stationary portion 1 and a body of said movable portion 2, said loading portion 3 rotates around said second stationary shaft 12. Said air input 5 is connected to an outer compressing air source.

Embodiment 3

Electric motor driving unit 15 in embodiment 1 is replaced by an hydraulic motor driving unit, a compressing air releasing unit is simultaneously arranged to cool busbars after heating, air used for said compressing air releasing unit is supplied through an air input 5.

Referring to FIG.22, a tool used for connecting busbars comprises an hydraulic motor driving unit and an electric control unit connected with an electrical power input, a stationary portion 1 removably connected to a first busbar, a movable portion 2 removably connected to a second busbar and a loading portion 3 for clamping connecting rods. Said connecting rod configured to mount to a pre-hole of a connecting surface of said first busbar and said second busbar, said first and second busbars being connected by said connecting rod. Said movable portion 2 is movably connected to a first and second stationary shaft 11,12 of said stationary portion 1, said movable portion 2 is connected to a movable shaft 13 by a screw pair, said movable portion 2 is fixedly connected to said hydraulic motor driving unit of said stationary portion 1, said movable shaft 13 is driven to rotate around its axis by said hydraulic motor driving unit, said loading portion 3 is movably connected to said second stationary shaft 12 of said stationary portion 1 and slides between a body of said stationary portion 1 and a body of said movable portion 2, said loading portion 3 rotates around said second stationary shaft 12. Said air input 5 is connected to an outer compressing air source.

What is claimed is:

1. A tool used for connecting busbars, said tool comprising an electric motor driving unit (15) and an electric control unit connected with an electrical power input; characterized in that said tool further comprising a stationary portion (1) removably connected to a first busbar, a movable portion (2) removably connected to a second busbar and a loading portion (3) for clamping connecting rods, said connecting rod configured to mount to a pre-hole of a connecting surface of said first busbar and said second busbar, said first and second busbars being connected by said connecting rod;

said movable portion (2) being movably connected to a first and second stationary shaft (11,12) of said stationary portion (1), said movable portion (2) being connected to a movable shaft (13) by a screw pair, said movable portion (2) being fixedly connected to said electric motor driving unit (15) of said stationary portion (1), said movable shaft (13) being driven to rotate around its axis by said electric motor driving unit (15), said loading portion (3) being movably connected to said second stationary shaft (12) of said stationary portion (1) and sliding between a body of said stationary portion (1) and a body of said movable portion (2), said loading portion (3) rotating around said second stationary shaft (12).

2. A tool used for connecting busbars according to claim 1, characterized in that said stationary portion (1) comprising said first stationary shaft (11), said second stationary shaft (12) parallel to said first stationary shaft (11), said movable shaft (13) parallel to said first stationary shaft (11), a first stationary plate (14) perpendicular to and fixedly connected to said first and second stationary shaft (11,12), a second stationary plate (16) perpendicular to and fixedly connected to said first and second stationary shaft (11,12), said electric motor driving unit (15) arranged between said first and second stationary plate (14,16), a third stationary plate (19) perpendicular to and fixedly connected to said first and second stationary shaft (11,12), a fourth stationary plate (110) perpendicular to and fixedly connected to said first and second stationary plate (14,16), a first positioning pillar (111) arranged to said fourth stationary plate (110) for inserting into a positioning hole of said first busbar;

said movable shaft (13) being fixedly connected to a rotating shaft of said electric motor driving unit (15) by a coupler(112);

said movable portion (2) comprising a seventh stationary plate (28), a fifth stationary plate (22) perpendicular to and fixedly connected to said seventh stationary plate (28), a sixth stationary plate (29) perpendicular to and fixedly connected to said seventh stationary plate (28), a second positioning pillar (25) arranged to said seventh stationary plate (28) for inserting into a positioning hole of said second busbar, a screw nut (21) arranged to said fifth stationary plate (22) for coupling with a screw portion of said movable shaft (13), a clamping portion (27) for clamping a busbar arranged between said fifth and sixth stationary plate (22,29) and through said seventh stationary plate (28), a limiting portion (24) arranged to said seventh stationary plate (28) for limiting said clamping portion (27) to move;

said loading portion (3) comprising two movable plates which respectively open or close with respect to an axis of said second stationary shaft (12), said movable plate comprising a receiving cavity for receiving connecting rods; said first and second stationary shaft (11,12) of said stationary portion (1) penetrating through said movable portion (2), an end of said movable shaft (13) of said stationary portion (1) rotatably connected to said third stationary plate (19), said movable portion (2) sliding between said third and first stationary plate (19,14) of said stationary portion (1), said second stationary shaft (12) of said stationary portion (1) penetrating through said loading portion (3), which slides between said fifth stationary plate (22) of said movable portion (2) and said first stationary plate (14) of said stationary portion (1) and rotates around said second stationary shaft (12), said fifth stationary plate (22) being parallel to said sixth stationary plate (29).

3. A tool used for connecting busbars according to claim 2, characterized in that said stationary portion (1) further comprising a first heating portion (17) arranged to said fourth stationary plate (110) for heating said first busbar, said first heating portion (17) movably connecting to said fourth stationary plate (110) to adjust a distance between said first heating portion (17) and said first busbar; said movable portion (2) further comprising a second heating portion (26) arranged to said seventh stationary plate (28) for heating said second busbar, said second heating portion (26) movably connecting to said seventh stationary plate (28) to adjust a distance between said second heating portion (26) and said second busbar.

4. A tool used for connecting busbars according to claim 3, characterized in that said stationary portion (1) further comprising a supporting portion (18) for supporting a loading portion (3), a supporting end of said supporting portion (18) penetrating through said first stationary plate (14), a length of said supporting end protruding from said first stationary plate (14) being adjusted by a sliding block of said supporting portion (18).

5. A tool used for connecting busbars according to claim 2, characterized in that said limiting portion (24) comprising a base (47), a straight pin (45) which has an interference fit with said base (47), a limiting end (46) for partly inserting into said base (47), a spring (42) for replacing said limiting end (46), a side cover (41) fixedly connected to said limiting end (46) and a ball head (49) for operating; said side cover (41) being fastened to said base (47) by snap-fits, said limiting end (46) comprising a tooth (44) for meshing with a teeth groove of said clamping portion (27), said tooth (44) comprising a recess (48) for matching with said straight pin (45), operating said ball head (49) being to release meshing between said tooth (44) and said teeth groove of said clamping portion (27), said spring (42) acting on said tooth (44) to make said tooth (44) mesh with said teeth groove.

6. A tool used for connecting busbars according to claim 2, characterized in that said first stationary shaft (11) fixedly connecting to said first stationary plate (14) by a first straight pin, said second stationary shaft (12) fixedly connecting to said first stationary plate (14) by a second straight pin, movable shaft (13) being rotatably connected to said first stationary plate (14) by a sleeve, said first stationary shaft (11) fixedly connecting to said second stationary plate (16) by a third straight pin, said second stationary shaft (12) fixedly connecting to said second stationary plate (16) by a fourth straight pin.

7. A tool used for connecting busbars according to claim 2, characterized in that said first stationary shaft (11) fixedly connecting to said third stationary plate (19) by a first spring pin, said second stationary shaft (12) fixedly connecting to said third stationary plate (19) by a second spring pin, said movable shaft (13) being rotatably connected to said third stationary plate (19) by a sleeve.

8. A tool used for connecting busbars, said tool comprising a pneumatic motor driving unit and an electric control unit connected with an electrical power input; characterized in that said tool further comprising a stationary portion (1) removably connected to a first busbar, a movable portion (2) removably connected to a second busbar and a loading portion (3) for clamping connecting rods, said connecting rod configured to mount to a pre-hole of a connecting surface of said first busbar and said second busbar, said first and second busbars being connected by said connecting rod;

said movable portion (2) being movably connected to a first and second stationary shaft (11,12) of said stationary portion (1), said movable portion (2) being connected to a movable shaft (13) by a screw pair, said movable portion (2) being fixedly connected to said pneumatic motor driving unit of said stationary portion (1), said movable shaft (13) being driven to rotate around its axis by said pneumatic motor driving unit, said loading portion (3) being movably connected to said second stationary shaft (12) of said stationary portion (1) and sliding between a body of said stationary portion (1) and a body of said movable portion (2), said loading portion (3) rotating around said second stationary shaft (12).

9. A tool used for connecting busbars, said tool comprising an hydraulic motor driving unit and an electric control unit connected with an electrical power input; characterized in that said tool further comprising a stationary portion (1) removably connected to a first busbar, a movable portion (2) removably connected to a second busbar and a loading portion (3) for clamping connecting rods, said connecting rod configured to mount to a pre-hole of a connecting surface of said first busbar and said second busbar, said first and second busbars being connected by said connecting rod;

said movable portion (2) being movably connected to a first and second stationary shaft (11,12) of said stationary portion (1), said movable portion (2) being connected to a movable shaft (13) by a screw pair, said movable portion (2) being fixedly connected to said hydraulic motor driving unit of said stationary portion (1), said movable shaft (13) being driven to rotate around its axis by said hydraulic motor driving unit, said loading portion (3) being movably connected to said second stationary shaft (12) of said stationary portion (1) and sliding between a body of said stationary portion (1) and a body of said movable portion (2), said loading portion (3) rotating around said second stationary shaft (12).

* * * * *